US007622831B2

(12) United States Patent
Chen

(10) Patent No.: US 7,622,831 B2

(45) Date of Patent: Nov. 24, 2009

(54) TOUCH-SENSITIVE PAPER SHREDDER CONTROL SYSTEM

(75) Inventor: Liangneng Chen, Jiading (CN)

(73) Assignee: Aurora Office Equipment Co., Ltd. Shanghai, Shanghai (CN)

( * ) Notice: Subject to any disclaimer, the term of this patent is extended or adjusted under 35 U.S.C. 154(b) by 0 days.

(21) Appl. No.: 11/827,798

(22) Filed: Jul. 12, 2007

(65) Prior Publication Data

US 2008/0041207 A1 Feb. 21, 2008

Related U.S. Application Data

(63) Continuation-in-part of application No. 11/468,651, filed on Aug. 30, 2006, now Pat. No. 7,471,017.

(30) Foreign Application Priority Data

Jul. 14, 2006 (CN) .................... 2006 2 0043955 U

(51) Int. Cl.
*H02H 11/00* (2006.01)

(52) U.S. Cl. ...................................................... 307/326

(58) Field of Classification Search ................. 307/112, 307/326; 241/37.5, 34; 192/130
See application file for complete search history.

(56) References Cited

U.S. PATENT DOCUMENTS

| | | | | |
|---|---|---|---|---|
| 3,785,230 | A | 1/1974 | Lockey | |
| 4,411,391 | A | 10/1983 | Crane | |
| 4,817,877 | A | 4/1989 | Itoh et al. | |
| 4,842,205 | A | 6/1989 | Araki et al. | |
| 5,044,270 | A | 9/1991 | Schwelling | |
| 5,897,065 | A | 4/1999 | Schwelling | |
| 5,988,542 | A | 11/1999 | Henreckson | |
| 6,065,696 | A | 5/2000 | Tsai | |
| 6,116,528 | A | 9/2000 | Schwelling | |
| 6,676,050 | B2 | 1/2004 | Chang | |
| 6,682,006 | B2 | 1/2004 | Lee | |
| 6,964,386 | B2 | 11/2005 | Ho | |
| 7,083,131 | B2 | 8/2006 | Ting | |
| 7,195,185 | B2 * | 3/2007 | Matlin | 241/36 |
| 7,303,158 | B1 * | 12/2007 | Abramson et al. | 241/30 |

(Continued)

OTHER PUBLICATIONS

PCT ISA/US, International Search Report and Written Opinion for PCT/US2008/012114 (Cited References Listed Herein).

*Primary Examiner*—Stephen W Jackson
*Assistant Examiner*—Carlos Amaya
(74) *Attorney, Agent, or Firm*—Wang, Hartmann, Gibbs, & Cauley, P.L.C.

(57) ABSTRACT

The invention is directed to a touch-sensitive paper shredder control system. The touching feature is implemented through a series of electronic circuits, taking input from a conductive touch panel on the shredder feed throat, processing the signal, and through a motor driving circuit, stopping the mechanical parts of the shredder. The system has a touch detection circuit unit, which contains a bioelectricity controlled switching circuit to sense the conductive touch panel. The bioelectricity controlled switching circuit is configured to trigger a ground switching circuit in the touch detection circuit unit which outputs to a multifunction control circuit unit. The control circuit unit then takes care of the remaining protection issues. The touching device for paper shredders protects humans and other living beings including pets from injuries through automatic and real time monitoring. The complete control process is both safe and sensitive.

19 Claims, 5 Drawing Sheets

U.S. PATENT DOCUMENTS

| | | | |
|---|---|---|---|
| 2002/0017183 | A1 | 2/2002 | Gass |
| 2006/0054725 | A1 | 3/2006 | Matlin |
| 2006/0219827 | A1 | 10/2006 | Matlin et al. |
| 2007/0012808 | A1 | 1/2007 | Kao |
| 2007/0034725 | A1 | 2/2007 | Duh |
| 2007/0246581 | A1 | 10/2007 | Matlin et al. |
| 2008/0105772 | A2 | 5/2008 | Matlin |

* cited by examiner

TOUCH-SENSITIVE PAPER SHREDDER CONTROL SYSTEM

CROSS-REFERENCE TO RELATED APPLICATION

The present application is a continuation-in-part of application Ser. No. 11/468,651, filed Aug. 30, 2006, now U.S. Pat. No. 7,471,017, entitled "Paper-breaker touching safety protector," issued Dec. 30, 2008 to Chen, which is assigned to the assignee hereof, and which is incorporated by reference herein in its entirety.

FIELD OF THE INVENTION

This invention is related to office equipment and the safe control of paper shredders, in particular touch-sensitive paper shredder control systems.

BACKGROUND OF THE INVENTION

Automated office appliances have proliferated in modern life and workspaces, and one of the most common appliances are paper shredders. Currently, paper shredders have entered into homes, some of them with automatic sensors. The sensors may be configured to detect objects inserted therein and signal the paper shredder to begin to work by grabbing the object and shredding them. Unless the paper shredder is turned off, the shredder may always be in stand-by mode. However, because paper shredders are destructive devices, if human users are not careful when using them, an injury may occur. Many current paper shredders do not have protective devices to prevent objects or body parts from entering into the throat of the shredder—potentially bringing a safety hazard into the office or home.

Among the present day paper shredders, there have been shredders using the technology of contact detection to stop the shredder's blades from injuring a person or pet. Referring to FIG. 1, the circuit shown therein is an example of this technology. SW2 is a polarity conversion switch and it can exchange the hot lead and ground lead of the AC power. Resistors R12 and R13, capacitors C3 and C2, and diodes D11, D12, D13, D14, D15 and D6 comprise a 24V power supply for the relay. Diode D6, D7, and capacitor C1 comprise a power supply for U1, the voltage detection integrated circuit. The positive terminal of the power supply is the hot line of the AC power. Relay switch RLY-1, diode D2, transistor Q1, resistors R5, R27, and R6, and optical coupler U5 comprise a power supply for the equipment. Diodes D1, D8 and D21, thermal control lamp (orange), transistor Q4, resistors R4, R14, and R11, and motor thermal control switch comprise a thermal control indication circuit. Fuse F1, switch RLY1, motor, function switch, and motor thermal control switch comprise a motor operation circuit. The rotation direction is determined by the function switch setting. Power supply, resistors R7, R1, R9, R2, R8 and R10, diodes D20, D16, D4, D5, D9 and D10, transistors Q2 and Q3, and pin 5 of the voltage detection integrated circuit comprise a LED indication circuit. The metal part of the panel, resistors R20, R19, R21 and R22, capacitor C8, and diodes D19 and D17 comprise a touch detection circuit.

When the function switch is set at the "off" position, the machine is not working. When the function switch is set at other positions and the wastepaper basket is separated from the machine, the machine is on but not capable of cutting paper. When the basket is detached from the machine body, the spring switch is open to cut power to the motor. The operation of the circuit for the breaking of the spring is as follows: pin 1 of U1 detects the break of the spring, pin 5 of U1 becomes "high", Q3 and Q2 cutoff and the motor doesn't turn. The power indicator and touch/basket detach indicator are on because these two indicators, R7, R8, D9, and the motor thermal control switch form a current loop.

When the function switch is moved away from "off", and the wastepaper basket is in position, the machine is ready to work. The sequence of circuit operation is as follows: pin 1 of U1 becomes "low" and Q3 and Q2 become conducting. At the same time, pin 6 of U1 becomes "low", Q1 is on, and the relay RLY 1 is closed. Now if the function switch is set at "on", the machine will cut the paper if there is paper in the throat, otherwise the shredder is on standby. Under these circumstances, if hands, metal, or living animals contact the metal part at the feed throat, AC power, circuit elements (R21, R19, R20,) and the contact will form a circuit, and turn off the motor because pin 8 of U1 now is "low" and pin 5 and 6 of U1 are "high". To be more specific, as pin 6 of U1 is "high", Q1 is off and the motor power is turned off. As pin 5 of U1 is "high" and Q2 and Q3 are cut off, the touch protection indicator is on. After the contact is removed from the feed throat, the shredder returns to normal operation.

The touch protection is achieved through the installment of conductive touch panel at the paper intake. When touching the conductive panel, the conductivity of human body provides a faint signal to the control circuit to activate the touch protection. In this case, two 2.2M ohm resistors largely decrease the current that flows through the human body and thus the circuit may not harm a human. By using this technique, a sensitive voltage detection integrated circuit is needed to monitor the status of the touch panel in real time. Thus the demand for a highly stable and sensitive integrated circuit is apparent. Circuit aging caused by long-term usage will also diminish or even cut the circuit's detection capability. As for the two resistors with high values, they limit the current that may flow through the human body, but they may also lose their capability in a humid environment. Moreover, a human may come in direct contact with AC power, causing electric shock or even endangering life.

SUMMARY OF THE INVENTION

The present invention solves the above-mentioned shortcomings by providing a touch-sensitive paper shredder control system making use of bioelectricity. The control process is safe and sensitive. The circuit is stable in performance, and can be applied in a wide degree of situations. To meet the above objectives, the touching device for paper shredders is constructed as below.

The touch-sensitive paper shredder control system may include a function module, power supply module, conductive touch panel, and a shredder mechanical component. The function module may include a touch detection circuit unit, motor reversal detection circuit unit, paper intake detection circuit unit, overload protection circuit unit, control circuit unit, and function switch having on, off, and reverse positions. All units in the function module may be connected directly to the control circuit unit except for the function switch, which, together with the control circuit unit, controls the motor driving circuit unit, and thus the shredder's mechanical components.

The power supply module may include an AC power interface switch, safety switch, fuse, control switch, power supply of control circuit unit, and motor driving circuit unit. The AC power interface switch, safety switch, fuse, and control switch may be connected in series and, through the control of the function switch, connect to the motor driving circuit unit. The control switch is a relay switch. The AC power, which flows through the fuse, is rectified, filtered and regulated to provide DC power to all circuit units.

The conductive touch panel may be connected to the touch detection circuit unit. The touch detection circuit unit consists of a bioelectricity controlled switching circuit and a ground switch circuit. The bioelectricity controlled switching circuit may be a transistor circuit with a first transistor where the touch panel is connected to the base of the first transistor via a first resistor. The base of the first transistor is also connected to ground via a parallel combination of a second resistor and a first capacitor. The emitter of the first transistor is connected to ground via a parallel combination of a third resistor and a second capacitor, and is also connected to the input of the ground switch circuit.

The collector of the first transistor drives in parallel, a power indicator LED and a touch indicator LED and is then connected to the power supply. The ground switching circuit is also a transistorized switching circuit having a second transistor. The base of the second transistor is connected to the output of the bioelectricity controlled switching circuit, the emitter is grounded, and the collector is connected to the input of the control circuit unit via an optical coupler and to the power supply via a fourth resistor.

The paper intake detection circuit unit is connected to the control circuit unit also. The paper intake detection circuit unit comprises a light emitting diode and a photosensitive diode. The emitting area of the former and the optics sensing part of the latter face each other and are installed on the walls of opposite sides of the feed throat. The overload protection circuit and the motor reversal detection circuit unit are connected to the control circuit unit.

The touch-sensitive paper shredder control system has adopted cascaded circuits to ensure human safety when a human touches the conductive touch panel. The electricity from the human body enables the bioelectricity controlled switching circuit, and then all the connected circuits. The control circuit unit disables the mechanical part of the shredder and it ensures human safety. Even if the power switch is turned on, the mechanical part of the shredder still doesn't work. The shredder realizes real time monitoring. The complete control process is both safe and sensitive. The machine performance is stable and reliable and easy to operate without human oversight.

BRIEF DESCRIPTION OF THE DRAWINGS

The invention is generally shown by way of reference to the accompanying drawings in which.

DETAILED DESCRIPTION OF THE INVENTION

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention.

Figure 1:
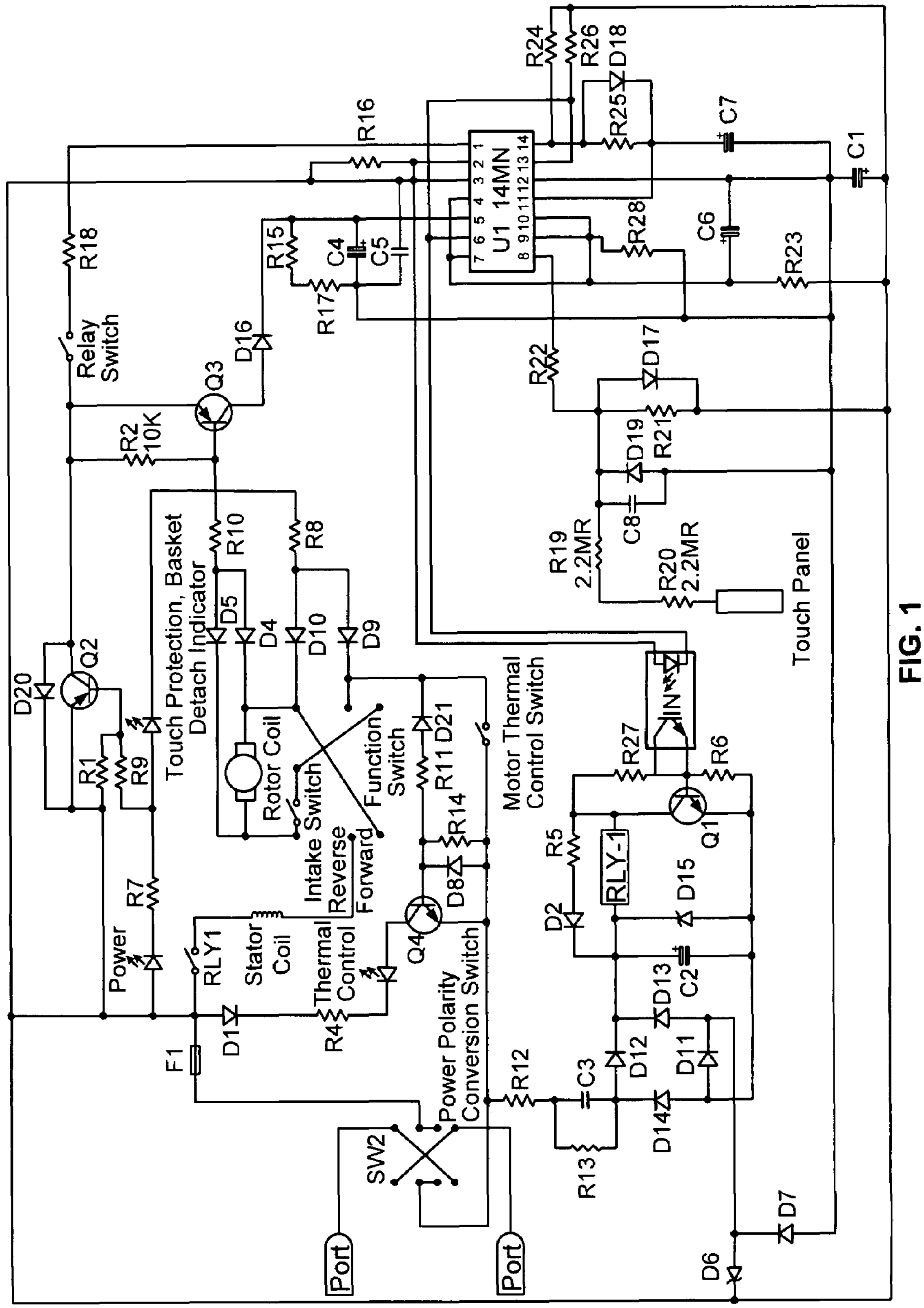
FIG. 1 is a circuit diagram illustrating the electrical components of a shredder control system using prior art technology.
Figure 2:
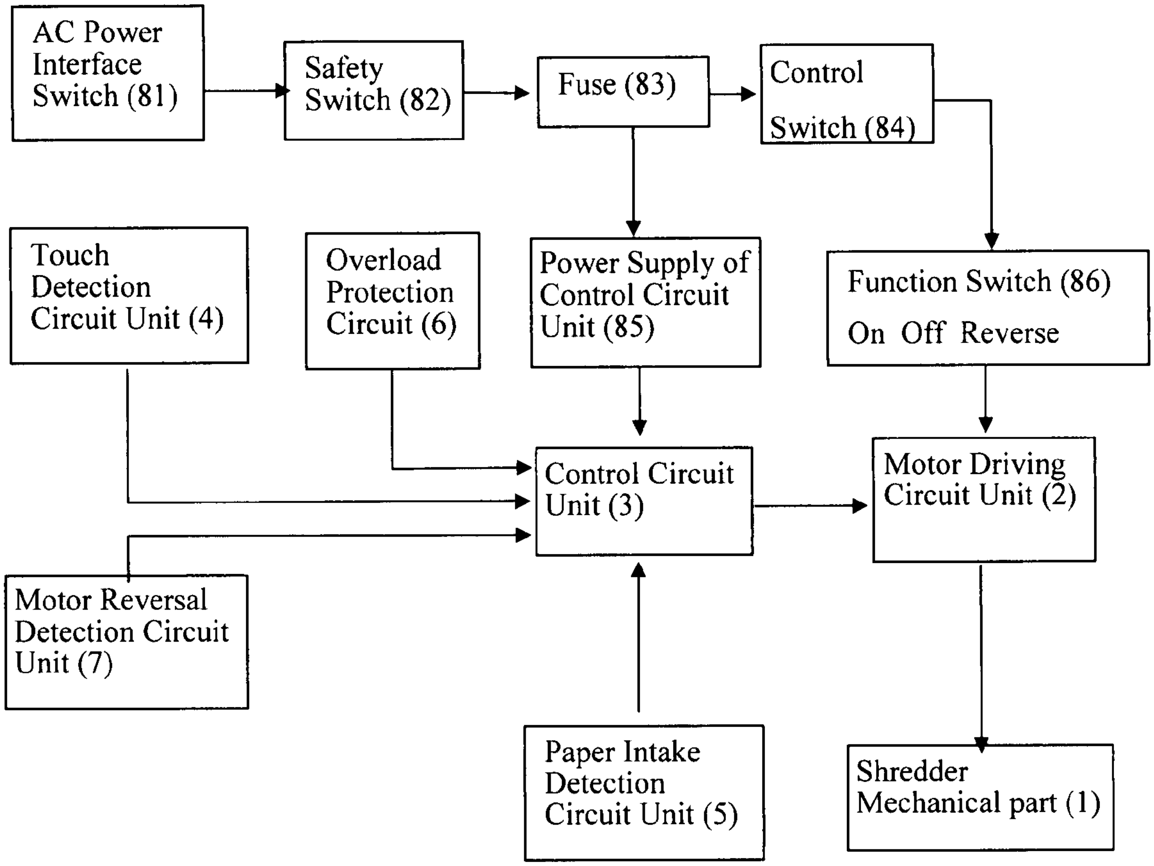
FIG. 2 is a block diagram of the components and modules within a touch-sensitive paper shredder control system of the present invention.

In one embodiment, the touch-sensitive paper shredder control system may include the following components: a function module, a power supply module, and shredder mechanical parts. Referring to FIG. 2, the function module consists of a touch detection circuit unit 4, motor reversal detection circuit unit 7, paper intake detection circuit unit 5, overload protection circuit 6, control circuit unit 3, and function switch 86. All of these units are connected directly to control circuit unit except for the function switch, which together with the control circuit unit controls the motor driving circuit unit 2, and then the shredder mechanical part 1. A conductive touch panel is connected to the touch detection circuit unit, which consists of a bioelectricity controlled switching circuit and a ground switching circuit.

The power supply module consists of an AC power interface unit 81, security switch 82, fuse 83, control switch 84, power supply of control circuit unit 85, and the motor driving circuit unit 2. The control switch is a relay switch, and the security switch is a door switch. The first four of the abovementioned units are connected in series and, through the control of function switch 86, connected to motor driving circuit unit. The power, through the fuse, is connected to the power supply of control circuit unit, and then to the control circuit unit.

Figure 3:
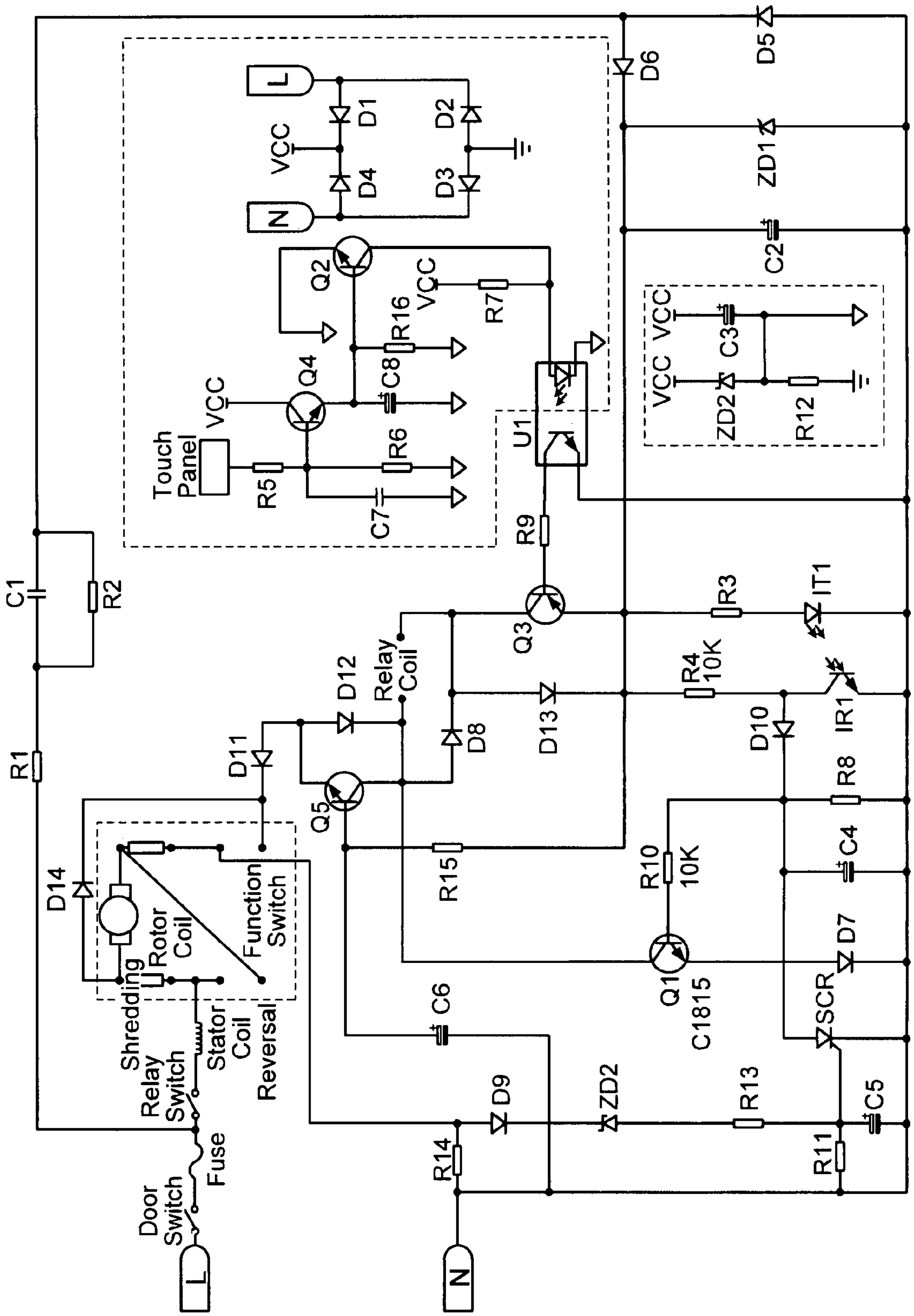
FIG. 3 is a circuit diagram of the electrical components of a touch-sensitive paper shredder control system of the present invention.

Turning to FIG. 3, in one embodiment, the bioelectricity controlled switching circuit is mainly a switching transistor circuit. The conductive touch panel is connected to the base of switching transistor Q4 via resistor R5. Transistor Q4 has its base connected to ground through paralleled capacitor C7 and resistor R6, its collector connected directly to power VCC, and its emitter connected to ground through paralleled capacitor C8 and resistor R16. The emitter of Q4 is also connected directly to the ground switching circuit.

The ground switching circuit is also a switching transistor circuit. The output from the bioelectricity controlled switching circuit is connected to the input of the ground switching circuit, i.e. the emitter of transistor Q2. Transistor Q2 has its emitter connected directly to ground, its collector connected to VCC through resistor R7, and its collector connected to the input of control circuit unit through an optical coupler U1.

Figure 4:
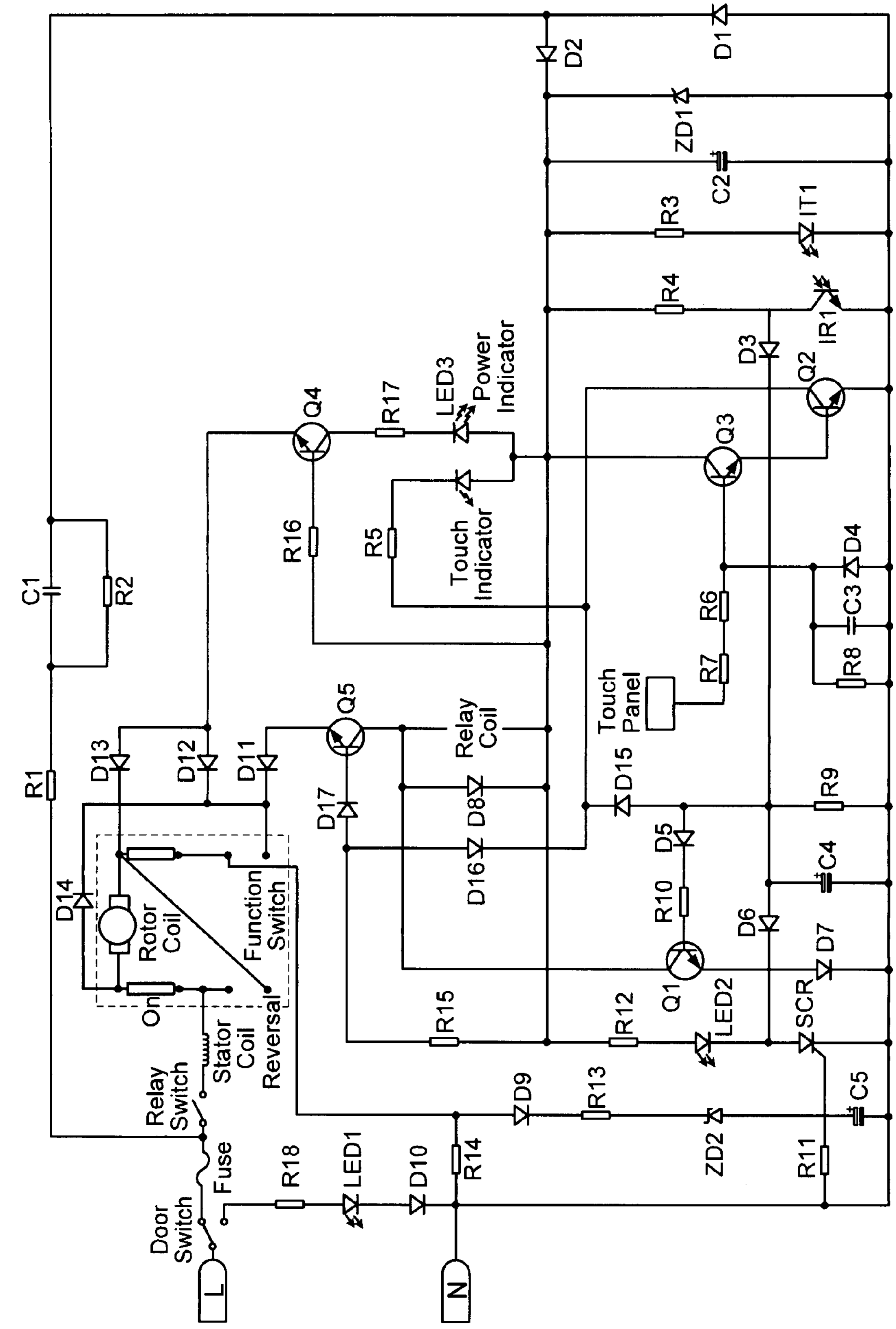
FIG. 4 is the circuit diagram of the electrical components of another embodiment of a touch-sensitive paper shredder control system of the present invention.

Referring to FIG. 4, in another embodiment a bioelectricity controlled switching circuit is based on transistor Q3. The touch panel is connected to the input of the bioelectricity controlled switching circuit, i.e. the base of the switching transistor Q3 through a serial combination of resistors R6 and R7. Transistor Q3 has its base connected to ground via a parallel combination of capacitor C3, diode D4, and resistor R8, the collector is connected to power supply VCC through a parallel combination of power indicator and touch indicator LED3, and the emitter is connected directly to the input of the ground switching circuit.

The ground switching circuit is also a transistor circuit. The output from the bioelectricity controlled switching circuit, i.e. the emitter of transistor Q3, is connected directly to the base of the switching transistor Q2. The emitter of transistor Q2 is connected directly to ground, and the collector is connected to the input of the control circuit unit 3.

Referring to FIG. 2 the paper intake detection circuit unit is connected to the control circuit unit 3. Now turning to FIG. 3, the paper intake detection circuit unit consists of a light emitting diode IT1, and a photosensitive diode IR1 which face each other on opposite positions on the wall of the feed throat of the shredder. Both the overload protection circuit unit 6 and the motor reverse detection circuit unit 7 are connected to the control circuit unit 3 of the touch-sensitive paper shredder.

Referring back to FIG. 2, both the motor reversal detection unit 7 and the paper intake detection unit 5 are connected to control circuit unit 3, then the motor driving circuit unit 2, and then to the shredder mechanical part 1. The motor reversal detection unit 7 detects the reversal signal, sends the electric signal to the control circuit unit 3, then electrically controls the shredder mechanical part 1 to reverse the motor direction through motor driving circuit unit 2. The paper intake detection circuit unit 5 detects the paper insertion at the feed throat, sends the signal to the control circuit unit, and then drives the shredder mechanical part to cut the paper through motor driving circuit unit.

Figure 5:
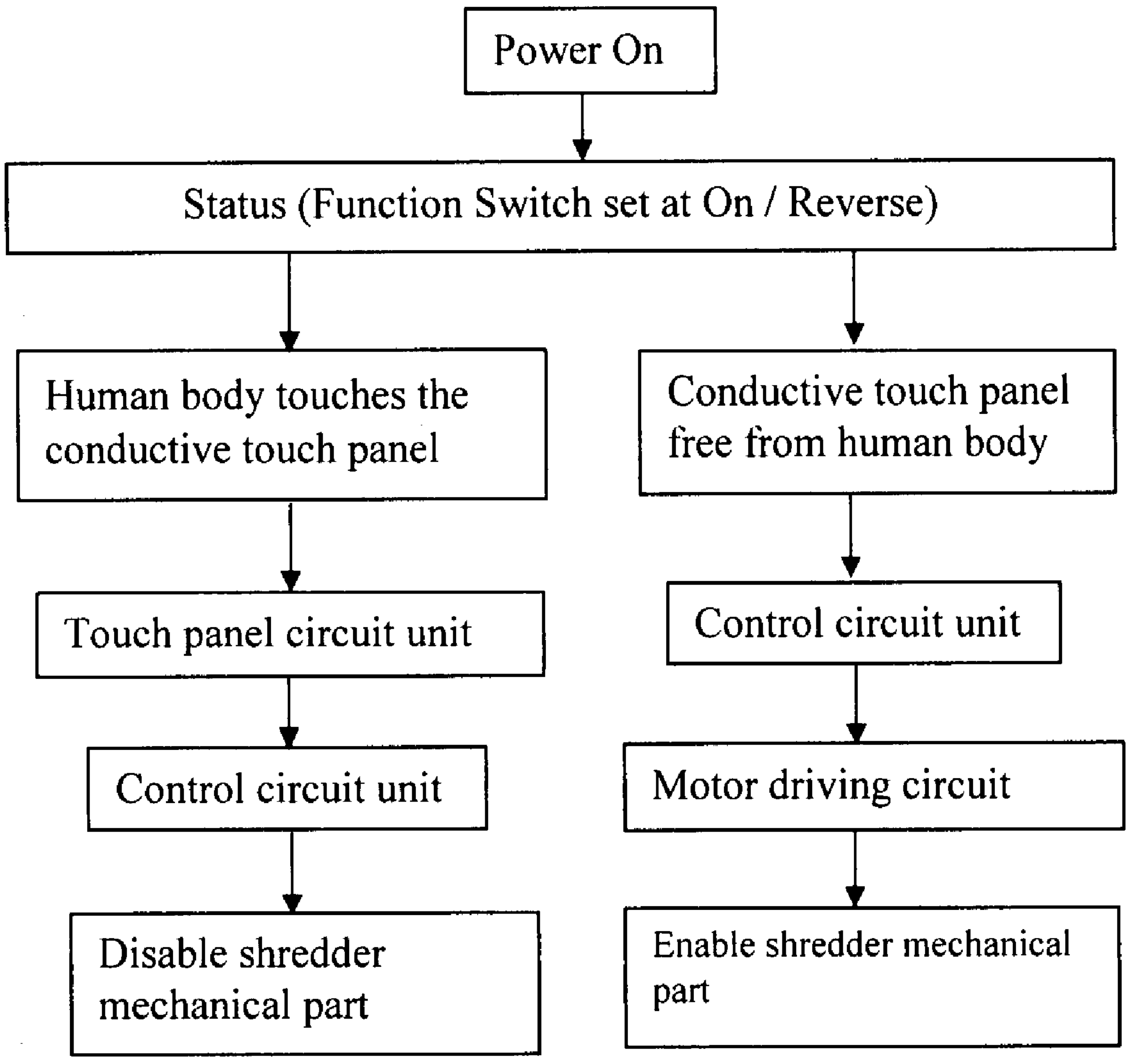
FIG. 5 is a flow chart of the control process used in connection with a touch-sensitive paper shredder control system of the present invention.

Referring now to FIG. 5, during the paper shredding process, if a human body touches the touch panel of the feed throat, the shredder will stop immediately. The touch signal is sent to touch detection circuit unit 4, then goes to control circuit unit 3, and stops the shredder by cutting the power to motor driving circuit unit 2. If a human body doesn't touch the conductive touch panel, the control circuit unit will release the control to motor driving circuit unit 2 to allow the mechanical part to work independently.

Referring back to FIG. 3, the shredder has the following features: overload protection; optics controlled shredding; shredding, shutdown, and reversed rotation functions; and automatic touch-stop.

The power supply of the control circuit unit is described below. AC input power is divided, rectified, regulated, and filtered by the circuit consists of resistors R1 and R2, capacitors C1 and C2, diodes D5 and D6, and Zener diode ZD1. The regulated 24 volts DC power is the power source for the control circuit unit. It's far below the safety voltage to pass through human body and will do no harm to human or animals.

The power supply for the touch detection circuit unit is described below. The AC input power, going through a bridge rectifier, is regulated and filtered to provide 12 volts DC voltage. The circuits consists of diodes D1-D4, Zener diode ZD2, resistor R12 and capacitor C3.

When a human touches the metal panel, the bioelectricity from the human body goes to the base of the transistor Q4 via a 1 MW resistor. The bioelectricity triggers transistors Q4 and Q2 on, cuts off transistor Q3, and thus cuts the motor power so that the shredder automatically stops when people touch the feed throat.

Referring now to FIG. 4, the shredder in this embodiment has the following features: on-off LED indicator; touch protection LED indicator; overload LED indicator; AC Power indicator; optics controlled shredding; and shredding, shutdown, and reversed rotation function.

The overload protection and door open LED indicating functions are implemented by the circuit consists of R18, R14, R13, R11, and R12, light emitting diodes LED1 and LED2, diodes D10, D9, and D6, Zener diode ZD2, capacitor C5 and silicon controlled rectifier SCR.

The power supply for the control circuit unit includes a circuit consisting of resistors R1 and R2, capacitors C1 and C2, diodes D1 and D2, Zener diode ZD1, and capacitor C2. The same regulated 24 volts DC power is used as the power source for the control circuit unit. It's far below the safety voltage to pass through a human body and will do no harm to human or animals.

The touching function is described below. When human touches the metal panel, the bioelectricity from a human body goes to the base of the transistor Q3 via resistors R6 and R7. The signal triggers Q3 and Q2 on, turns Q1 off, and cuts the power to the motor. The motor stops turning and people are protected. The touch detection circuit unit will be more stable if it uses an independent bridge power supply and is isolated from the motor by an optical coupler.

When a human touches the panel, the touch of human on the metal part of the panel provides a triggering signal which via base bias circuit, turns Q3 on. The base bias circuit consists of resistors R7, R6 and R8, diode D4, and capacitor C3. With enough forward voltage from a human Q3 and Q2 are both turned on. When Q2 is on, its collector voltage drops and thus it turns on touch indicator via R5, turns off Q5 via D16, and turns off Q1 via D15. If the machine were turning reversely at this moment, Q5 would be on. But because of the touch voltage, Q5 is turned off and so is the motor. The other situation is when the machine is in a shredding state. In this case Q1 would be on to turn the motor in the forward direction. But because of human touch Q1 is turned off and motor is turned off, too. In either case, the machine is shut off to ensure the safety of human.

When a human no longer touches the machine's metal plate, transistor Q3 turns off because there is no trigger voltage and the machine returns to a normal working state. The working principle of the power on indicating circuit is as below. When the machine is in the shredding or reversal state as selected from the function switch, the power on indicator in on and when the machine is in a stopped state, the indicator is off. The indicator circuit includes an indicator lamp, resistors R17 and R16, and transistor Q4. When the machine is in the stop state, the indicator is off because transistor Q4 is not conducting. As for the reversal state, the emitter junction of transistor Q4, diode D12, and function switch complete a circuit and the power on indicator is on. While the machine is in the shredding state, the emitter of Q4, diode D13, and the function switch complete a circuit and the power indicator is on.

As detailed above, the touch-sensitive paper shredder control system has adopted cascaded circuits. On the machine feed throat there is a conductive touch panel, which is connected to bioelectricity controlled switching circuit, ground switching circuit, control circuit unit, and then shredder mechanical part. All these circuits ensure human safety when human touches the conductive touch panel. The electricity from a human body enables the bioelectricity controlled switching circuit, and then all the connected circuits. The control circuit unit disables the shredder mechanical part and it ensures human safety. Even if the power switch is turned on, the mechanical part of the shredder still won't work if a human is touching the touch panel. The shredder realizes real time monitoring and the complete control process is both safe and sensitive. The machine performance is stable and reliable. It is easy to operate without human intrusion, can be applied in wide situations, and brings safety assurance.

Although the present invention has been described by way of example with references to the circuit drawings, it is to be noted herein that various changes and modifications will be apparent to those skilled in the art. Therefore, unless such changes and modifications depart from the scope of the present invention, they should be construed as being included therein.

What is claimed is:

1. A touch-sensitive paper shredder control system comprising:

a power supply;

a shredder motor;

a bioelectricity controlled switching circuit comprising a touch panel therein, the touch panel configured to be placed near a throat of a shredder; and a ground switching circuit;

wherein the bioelectricity controlled switching circuit and ground switching circuit are configured to work in connection with circuitry in the control system to stop the shredder motor in the event the touch panel is contacted by a living being.

2. The touch-sensitive paper shredder control system of claim 1, wherein:

the system further comprises an optical coupler;

the bioelectricity controlled switching circuit is configured with a first transistor;

the ground switching circuit is configured with a second transistor; and wherein the bioelectricity controlled switching circuit is configured to receive bioelectricity through a living being touching the touch panel and thus trigger the first transistor to send a signal to the ground switching circuit;

wherein the ground switching circuit is configured to receive a signal from the bioelectricity controlled switching circuit to trigger the second transistor to send a signal to the optical coupler;

wherein the optical coupler is configured to receive a signal from the ground switching circuit and to trigger circuitry within the control system to stop the shredder motor.

3. The touch-sensitive paper shredder control system of claim 1, wherein:

the control system includes a three position switch having, on, off, and reverse positions; and the control system is operable to disable the shredder when the three position switch is in the on and reverse positions.

4. The touch-sensitive paper shredder control system of claim 1, wherein:

power to the shredder motor is controlled by a relay switch.

5. A touch-sensitive paper shredder control system comprising:

a power supply;

a shredder motor;

a touch panel; and wherein when the shredder motor is operating and when a living being contacts the touch panel, bioelectricity from the living being triggers the control system to stop sending power from the power supply to the motor and thus stop the motor.

6. The touch-sensitive paper shredder control system of claim 5, wherein:

the control system circuitry comprises a bioelectricity controlled switching circuit, a ground switching circuit, and an optical coupler;

wherein the control system is configured so that bioelectricity from a living being passes through the touch panel and into the bioelectricity controlled switching circuit which triggers the ground switching circuit which triggers the optical coupler which interacts with further circuitry in the control system to stop sending power from the power supply to the motor and thus stop the motor.

7. The touch-sensitive paper shredder control system of claim 6, wherein:

the bioelectricity controlled switching circuit is a transistorized circuit; and the grounding circuit is a transistorized circuit.

8. A touch-sensitive paper shredder control system comprising:

a shredder motor;

a power supply;

a function module comprising;

a touch detection circuit unit having a touch panel;

a motor reversal detection circuit unit;

a paper intake detection circuit unit;

an overload protection circuit unit;

a control circuit unit; and a function switch;

wherein when a living being touches the touch panel while the shredder is operating, bioelectricity flows through the touch detection circuit and triggers circuitry within the control system to stop the power supply from sending power to the motor, thus stopping the motor.

9. The touch-sensitive paper shredder control system of claim 8, wherein:

the touch detection unit, motor reversal detection circuit unit, paper intake detection circuit unit, and the overload protection circuit unit are coupled to the control circuit unit; and the function switch together with the control circuit unit controls a motor driving circuit unit.

10. The touch-sensitive paper shredder control system of claim 8, wherein:

the power supply comprises a power supply module comprising;

an AC power interface unit an AC power interface unit;

a safety switch;

a fuse;

a control switch;

a power supply of control circuit unit;

a motor driving circuit unit;

the control switch is a relay switch, and the safety switch is a door switch;

the AC power interface unit, safety switch, fuse, and control switch are connected in series and, through the control of function switch, connected to the motor driving circuit unit; and the AC power, through the fuse, is rectified, filtered and regulated to provide DC power to all circuit units.

11. The touch-sensitive paper shredder control system of claim 8, wherein:

the touch detection circuit unit having a touch panel comprises a bioelectricity controlled switching circuit with a first transistor, having an emitter, collector and base; and the base of the first transistor is connected to the touch panel via a first resistor and connected to ground via a parallel combination of a second resistor and a first capacitor, the collector is connected to a power supply, and the emitter is connected to ground via a parallel combination of a third resistor and a second capacitor, and the emitter is also connected to the input of a ground switching circuit.

12. The touch-sensitive paper shredder control system of claim 8, wherein:

the touch detection circuit further comprises a ground switching circuit with a second transistor, having an emitter, collector and base; and the base of the second transistor is connected to the output of the bioelectricity controlled switching circuit, the emitter is grounded, and the collector is connected to the input of the control circuit unit.

13. The touch-sensitive paper shredder control system of claim 8, wherein:

the touch detection circuit unit having a touch panel comprises a bioelectricity controlled switching circuit with a first transistor, having an emitter, collector and base; and the collector of the first transistor is coupled to power indicator LED and touch indicator LED in parallel and then to a power supply.

14. The touch-sensitive paper shredder control system of claim 8, wherein:

the touch detection circuit operates to stop the shredder motor when the motor is rotating in either forward or reverse directions.

15. The touch-sensitive paper shredder control system of claim 8, wherein:

the paper intake detection circuit unit comprises a light emitting diode and a photosensitive diode;

an emitting area of the light emitting diode and an optics sensing part of the photosensitive diode face each other and are installed on the wall of the opposite sides of a feed throat of a shredder.

16. The touch-sensitive paper shredder control system of claim 10, wherein:

the control switch is a relay switch.

17. A method of controlling a paper shredder with a touch-sensitive device comprising:

providing a power supply capable of rotating a shredder motor in either forward or reverse directions;

providing a touch-sensitive touch panel near the mouth of a shredder for sensing a living being's touch;

providing circuitry comprising a touch detection circuit configured to work with the touch panel;

wherein when a living being touches the touch panel while the motor is in operation, bioelectricity triggers the touch detection circuit;

wherein when the touch detection circuit is triggered, the touch detection circuit triggers an optical coupling;

wherein when the optical coupling is triggered, circuitry directs the power supply to cut-off power to the shredder motor and thus stop the shredder motor.

18. A paper shredder safety system comprising;

a power supply;

a shredder motor;

a ground switching circuit;

a bioelectricity controlled switching circuit comprising a touch panel therein, the touch panel configured to be placed substantially on an external surface of a shredder and in the proximity of a feed throat of the shredder; and the power supply providing power to the shredder motor, the bioelectricity controlled switching circuit, and the ground switching circuit;

wherein the bioelectricity controlled switching circuit operates to activate the ground switching circuit and thereby stop the shredder motor in response to bioelectricity contacting the touch panel.

19. A paper shredder system comprising:

a power supply;

a shredder motor;

an intermediary switching circuit;

a bioelectricity controlled switching circuit comprising a touch panel therein, the touch panel configured to be placed substantially on an external surface of a shredder and in the proximity of a feed throat of the shredder;

the power supply providing power to the shredder motor, the bioelectricity controlled switching circuit, and the intermediary switching circuit; and the intermediary switching circuit being connected to the shredder motor and the bioelectricity controlled switching circuit;

wherein the bioelectricity controlled switching circuit operates to activate the intermediary switching circuit thereby stopping the shredder motor in response to bioelectricity contacting the touch panel.

* * * * *